United States Patent Office 2,755,308
Patented July 17, 1956

2,755,308

METHOD FOR OBTAINING ALIPHATIC ALCOHOLS

Walter Rottig, Oberhausen-Sterkrade-Nord, Germany, and August Hagemann, deceased, late of Duisburg-Meiderich, Germany, by Elisabeth Charlotte Margarete Hagemann, Duisburg-Meiderich, and Ernst Etzbach, Koln-Mansfeld, Germany, administrators, assignors to Ruhrchemie Aktiengesellschaft, Oberhausen-Holten, Germany, a corporation of Germany, and Lurgi Gesellschaft fuer Waermetechnik m. b. H., Frankfurt am Main-Hedderheim, Germany, a corporation of Germany No Drawing. Application August 31, 1951,
Serial No. 244,732

Claims priority, application Germany September 9, 1950

4 Claims. (Cl. 260—638)

This invention relates to a method for obtaining aliphatic alcohols.

As is known, aliphatic alcohol may be obtained from olefine-containing carbon monoxide hydrogenation products by the so-called oxo-synthesis, i. e. by catayltic addition of water gas followed by hydrogenation. In order to obtain economic yield in this process, the carbon monoxide hydrogenation must be carried out in such manner that the synthesis products formed have the highest possible content of olefine hydrocarbon.

When using a straight gas passage in carbon monoxide hydrogenation, however, only unsatisfactory olefine yields are obtained. Up to the present time the known carbon monoxide hydrogenation methods have not given a sufficient olefine yield for the oxo-synthesis. Attempts have been made to increase the olefine yields by recycling the synthesis gases using special catalysts and working up the carbon monoxide-rich gas. These measures, however, have not proven sufficiently satisfactory. Furthermore, these methods must be considered outdated in view of the present status of the synthesis art, as hourly gas charges of 100 parts by volume of inlet gas per part by volume of catalyst are used with catalyst tube lengths of a maximum of 3 to 4.5 meters. This is very uneconomical.

A new method of obtaining carbon monoxide hydrogenation products which are rich in olefins is called the "high charge synthesis." In this new high charge synthesis method iron catalysts are used with an hourly charge of at least 500 to 1,000 parts by volume of synthesis gas per part by volume of catalyst at increased pressure of preferably about 20 to 30 kilograms per square centimeter. The broad range of the increased synthesis pressure is from about 10–100 kilograms per square centimeter, being employed at temperatures of about 160–280° C. In this method synthesis ovens are used which have a length of 10 to 12 meters. Generally iron catalysts are used having a small alkali content and which are impregnated with alkali silicates in such a manner that a definite alkali:$SiO_2$ ratio is maintained (1:4 or 1:5). The reduction of such catalysts is performed at high gas velocities after reduction leaving 30–50% of the total iron content in the form of free iron. The use of this new method allows a substantial increase in the oven capacity as compared with the conventional units previously used. Thus the new method will allow a daily output of 50 tons as compared with the daily output of 2.5 tons of synthesis products from the former conventional oven. This course brings about a substantial reduction of the equipment costs. On the other hand, the methane formation in the high charge synthesis is not greater, as would be expected by the increased operating temperature, but is rather somewhat less than in synthesis with normal charge. The $CO+H_2$ conversion furthermore reaches at least the level previously customary.

The new high charge synthesis has the essential feature that in addition to bringing about larger quantities of products boiling above 320° C. which reach approximately 30 to 50% of the total liquid products, it also brings about in all fractions considerable increase in the olefine content. The synthesis products lying in the gasoline boiling range contain, for example, 70 to 80% olefins, while those in the diesel oil boiling range contain approximately 60% olefins and those in the fraction boiling between 320 and 460° C. still contain on an average of about 30% olefins.

In addition to the high charge synthesis the so-called fluidized synthesis, which operates with suspended eddying iron catalysts, gives a high yield of olefine hydrocarbons. In this method, the synthesis temperature, must, however, be maintained so high that there are produced hydrocarbons which boil as little above 320° C. as is possible. The synthesis products boiling above the temperature cause a cementing together of the catalyst grains and greatly disturb the use of a freely suspended catalyst layer. Therefore, in the fluidized synthesis, the normal liquid synthesis products contain only approximately 1 to 3% of products boiling above 320° C. as compared with 30 to 50% of products of this boiling point range in the high charge synthesis method.

One object of this invention is the production of a high yield of aliphatic alcohols from olefine containing carbon monoxide hydrogenation products. This, and still further objects will become apparent from the following description:

It has now been found that synthesis products of the high charge synthesis can be worked in a particularly advantageous manner into valuable synthetic alcohol mixtures by means of oxo-synthesis. The low boiling olefins of a molecular size of $C_2$ to $C_4$ which are produced by this high charge synthesis, are only present in a comparatively small quantity, while the maximum olefine formation lies in general at a molecular size of approximately $C_6$. The subsequent oxo-synthesis accordingly gives high yields of $C_6$ to $C_7$ alcohols which are particularly valuable for numerous industrial purposes.

As the carbon number increases, as is conventional in any carbon monoxide hydrogenation, the yield of products in relation to the total yield of liquid products decreases. In spite of this, according to the present invention, even the relatively high C number fraction can be converted into a good yield of alcohol by the oxo-synthesis. Thus, for example, in the diesel oil fraction which is about 18% of the liquid products produced in the synthesis, approximately 12% of the total olefine content can be converted into alcohols. This is a relatively good yield considering that roughly 60% of the total liquid diesel oil fraction is olefins. Even from fractions boiling between 320 and 460° C., which contain on the average of about 30% olefins, good yield of $C_{18}$ to $C_{22}$ alcohols can be obtained which are economically readily utilizable. The olefins corresponding to these alcohols boil between 320 and 380° C. and are still present to the extent of about 50% in the corresponding fraction of the high charge synthesis.

The new combination in accordance with the present invention of the high charge synthesis and the subsequent oxosynthesis (formylation) offers large fundamental advantages due to its operational flexibility. The most desirable alcohols, depending on the existing market requirements, can be prepared from the corresponding olefins by merely cutting the fraction which contains these olefins out of the high charge synthesis products. The remaining fractions can then be used, as required, for other purposes or further worked in accordance with other processes such as, for example, by splitting, aromatizing, isomerizing or polymerizing. In this way the combination in accordance with the invention offers an excellent possibility of use of all synthesis products, even in those cases in which only very special alcohol fractions are desired.

A further advantage of the new combination consists in the fact that there are always available large quantities of hydrocarbons boiling above 320° C. From these, there can be prepared, on the one hand, including direct alcohol synthesis, valuable high-boiling alcohols of a molecular size of more than $C_{18}$ in yields which could not previously be obtained. On the other hand, the remaining paraffins can be sold as a valuable raw material for numerous branches of industry, particularly after a mild hydrogenation.

Whenever the term "oxo-synthesis" is used herein and in the claims, and whenever a catalytic water gas addition followed by hydrogenation is mentioned, there is meant thereby a catalytic water gas addition and hydrogeneration under the conventional known conditions as set forth in "Angewandte Chemie," A. 60, 1948, S.225 and "New Modifications of the Oxo-Process," Wender, Orchin, Storch, published in "Armed Forces Chemical Journal" IV, S. 4, 1950.

The following example will clearly illustrate the invention and is given solely for this purpose and not to limit the invention, the invention being limited by the appended claims or their equivalents:

*Example*

For the carbon monoxide hydrogenation, there was used a catalyst which contained 0.5 part by weight of copper, 5.3 parts by weight of potassium water glass, and 27 parts by weight of kieselguhr per 100 parts by weight of iron. This iron catalyst was prepared in the well-known manner by precipitation with soda at a pH of 7 from nitrate solutions of the metal. The precipitated catalyst mass, after it was carefully washed with water glass, was impregnated until it had the indicated potassium content. The catalytic reduction was effected at approximately 280° C. with hydrogen at a linear gas velocity of approximately 1.5 m./sec. The time or reduction was about 60 minutes, there being achieved a reduction of 30% metallic iron, computed on basis of the catalyst iron content.

In the carbon monoxide hydrogenation, a gas pressure of 30 kgs./cm.$^2$ and a synthesis temperature of 245° C. were maintained. The gas charge was 750 parts by volume of fresh gas per part by volume of catalyst per hour. Furthermore, a recycling of 1 part by volume of fresh gas for every 3 parts by volume of recycled gas was employed. The fresh gas contained 40 vol. percent CO and 51 vol. percent $H_2$. The CO+$H_2$ conversion was 60 to 62%. The methane formation was approximately 3 to 4% of the CO+$H_2$ conversion.

47% of the liquid synthesis products had a boiling point above 320° C. The products having a boiling point of up to 200° C. contained 75% olefins. The fraction passing over between 200 and 320° C. contained 60% olefins, while the fraction boiling between 320 and 360° C. still contained about 50% olefins. The gaseous hydrocarbons of a molecular size of $C_3$ to $C_4$ constituted 8% of the total carbon monoxide hydrogenation products and consisted to the extent of about 70% of olefins. Furthermore, the gasoline fraction with a boiling point of up to 200° C. still contained about 5% primary alcohols, while the diesel oil fraction with a boiling point of 200 to 320° C. still contained about 3% primary alcohols. From the aqueous synthesis products, it was possible to isolate small quantities of $C_1$ to $C_3$ alcohols.

The total fraction of molecular size $C_3$ to $C_{18}$ (boiling point up to 320° C.) was catalytically reacted in the known manner with watergas at a pressure of 100 to 200 kgs./cm.$^2$. As catalyst, there were used cobalt salts dissolved in water. Reduced cobalt compounds could also be used in their stead.

The olefins present in the hydrocarbon mixture used were converted into alcohol to the extent of more than 95%, the necessary hydrogenation stage which converted the aldehyde initially formed into the corresponding alcohol being carried out with the same catalyst as the one used in the watergas addition.

The distribution of the entire primary produce after the formylation and hydrogenation of the $C_3$–$C_{18}$ fraction is as follows:

| | Percent |
|---|---|
| Primary alcohols $C_1$–$C_3$ | 1.3 |
| Alcohols from the watergas addition $C_3$–$C_{18}$ including primary alcohols | 45.7 |
| Total alcohol content | 47.0 |
| Saturated hydrocarbons of the $C_2$ fraction | 2.6 |
| Saturated hydrocarbons of the $C_3$–$C_4$ fraction | 2.0 |
| Saturated hydrocarbons of the $C_5$–$C_{18}$ fraction | 14.2 |
| Total saturated hydrocarbons | 18.8 |
| Previously separated primary fraction boiling above 300° C. | 34.2 |

If the fractions boiling between 320 and 400° C. are included in the oxo-synthesis, the total alcohol yield rises to about 54%, about 7 to 8% of which, referred to the total primary products, evolve after formylation and hydrogenation of the $C_3$ to $C_5$ fraction, into the valuable $C_{18}$–$C_{25}$ alcohols. The yield of hydrocarbons having a boiling point of more than 320° is reduced in this case to about 27%.

We claim:

1. Process for the conversion into aliphatic alcohols of olefins obtained from the hydrogenation of carbon monoxide with fixed bed iron catalyst at a gas pressure of about 10–100 kg. per square centimeter and a gas charge of at least 500 parts per volume of gas per part per volume of catalyst per hour, and with the production of at least 30% of liquid products boiling over 320° C. including the conversion of olefins in the hydrocarbon fraction boiling between 320° C. and 460° C., which comprises subjecting the olefin-containing hydrocarbon mixture obtained from said hydrogenation, including the fraction having a molecular size between $C_3$ and $C_{18}$ and boiling up to 320° C. in admixture with the fraction boiling between 320° C. and 460° C., to a catalytic water gas addition using a cobalt catalyst, hydrogenating the addition products and recovering the aliphatic alcohols formed.

2. Process according to claim 1, in which the olefin-containing hydrocarbon mixture is obtained from the catalytic hydrogenation of carbon monoxide at pressures between about 20 and 30 kilograms per square centimeter.

3. Process according to claim 1, in which said olefin-containing hydrocarbon mixture is obtained from the catalytic hydrogenation of carbon monoxide with a gas charge of at least 1,000 parts by volume of gas per part per volume of catalyst per hour.

4. Process for the conversison into aliphatic alcohols of olefins obtained from the hydrogenation of carbon monoxide with fixed bed iron catalyst at a gas pressure of about 10–100 kg. per square centimeter and a gas charge of at least 500 parts per volume of gas per part per volume of catalyst per hour, and with the production of at least 30% of liquid products boiling over 320° Co., including the conversion of olefins in the hydrocarbon fraction boiling between 320° C. and 400° C., which comprises subjecting the olefin-containing hydrocarbon mixture obtained from said hydrogenation, including the fraction having a molecular size between $C_3$–$C_{18}$ and boiling up to 320° C. in admixture with the fraction boiling between 320° C. and 400° C., to a catalytic water gas addition, using a cobalt catalyst, hydrogenating the addition products and recovering the aliphatic alcohols formed.

References Cited in the file of this patent

UNITED STATES PATENTS

| | | |
|---|---|---|
| 2,351,248 | Wirth et al. | June 13, 1944 |
| 2,415,102 | Landgraf et al. | Feb. 4, 1947 |
| 2,549,111 | Millendorf et al. | Apr. 17, 1951 |
| 2,560,360 | Mertzweiller et al. | July 10, 1951 |

FOREIGN PATENTS

| | | |
|---|---|---|
| 668,557 | Great Britain | Mar. 19, 1952 |

OTHER REFERENCES

Chem. and Met. Eng., vol. 53, January 1946, pages 220, 222, and 224.

I. G. Farben patent application I 67,906 IVd/120, O. Z. 12,360 (3 pp.) T. O. M. Reel 36, Item 21 and part of Item 36. Deposited in Library of Congress, March 12, 1946. (Also available in "Oxo Process" by Meyer & Co., Inc., pages 17–19.)

Fiat Final Report No. 1267 (PB 97,368), April 14, 1949, pages 77 to 79 and 158 to 161.